W. L. Clark.
Water Gate.
Nº 66,796.        Patented Jul. 16, 1867.
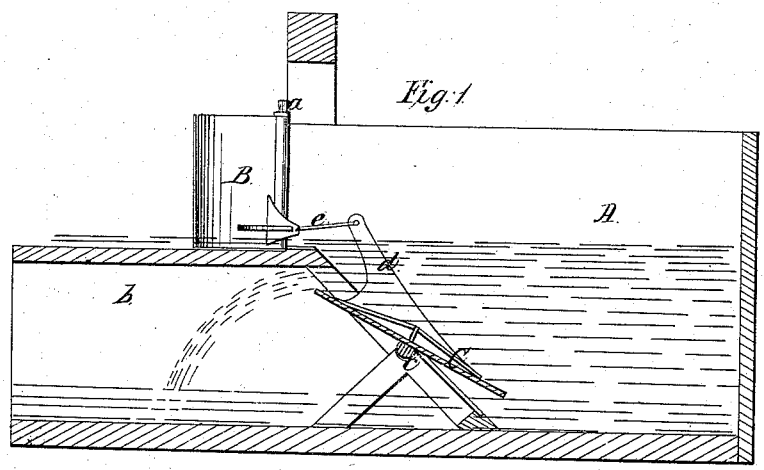
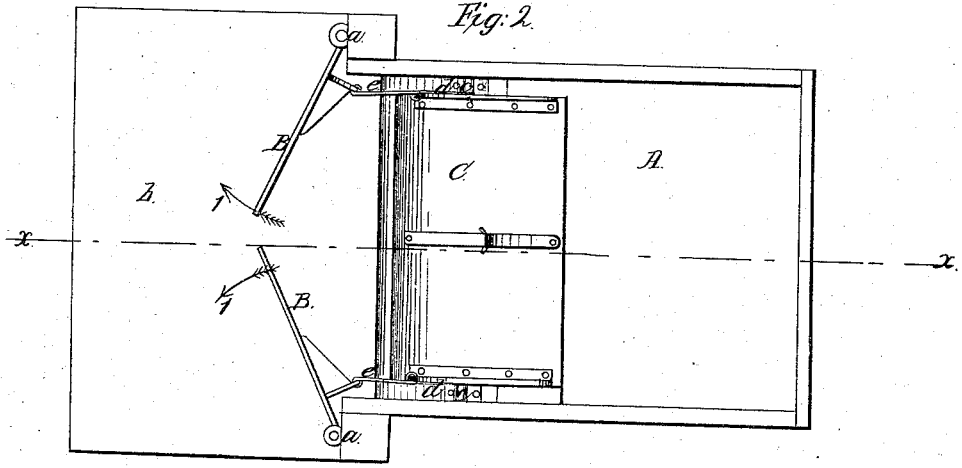
Witnesses;
F. A. Jackson
W. Trewin
Inventor;
Wm L. Clark
Per Munn & Co
Attorneys

United States Patent Office.

WILLIAM L. CLARK OF CAMBRIA, WISCONSIN.

Letters Patent No. 66,795, dated July 16, 1867.

---

IMPROVED FLOOD OR WASTE-GATE.

---

The Schedule referred to in these Letters Patent and making part of the same.

---

TO ALL WHOM IT MAY CONCERN:

Be it known that I, WILLIAM L. CLARK, of Cambria, in the county of Columbia, and State of Wisconsin, have invented a new and improved Flood or Waste-Gate; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x$ $x$, fig. 2.

Figure 2, a plan or top view of the same.

Similar letters of reference indicate corresponding parts.

This invention relates to a new and improved self-acting flood or waste-gate, for the preservation of mill-dams, canals, and all water-courses where there are occasional freshets or is an excess of water.

A represents a flume or box, which is built or fitted in a dam or bulk-head, and is provided at the upper part of its outer or discharge end with two gates, B B, hung or hinged at one end, as shown at $a$ $a$, and opening outward in the direction indicated by the arrows 1, in fig. 2, the flume or box being extended outward below the gates B B, as shown clearly in fig. 1 at $b$. C represents a gate, which is hung centrally on a horizontal axis, $c$, at the inner end of the extended part $b$ of the flume or box, and is provided at each side with a projecting arm or ledge, $d$, the upper ends of which are connected by rods $e$ to the lower parts of the hinged ends of the gates B B. By this arrangement it will be seen that when the gates B B are opened the gate C will also be opened, and when the latter is closed the gates B B will also close, owing to the connection formed between the gates B B C. The gate C, when closed, does not entirely close the inner end of the extension $b$ of the flume or box, a space or opening being allowed for the escape of water.

From the above description it will be seen that when there is an excess of water, more than can pass over the upper end of gate C, the water will rise in A, and press open the gates B B, and consequently open the gate C, so that there will be a free escape of the water through A. When the water declines in A, and the pressure on or against the gates B B subsides, the pressure of the water on gate C will close it, and gate C will close the gates B B. The gate C, it will be seen by referring to fig. 1, never reaches a horizontal position; it being always inclined, in order that it may close suddenly when the water in A lowers sufficiently so as not to act against the gates B B. The object in having a current of water always passing through the flume or box A is to prevent freezing, a contingency which would prevent the gates from operating.

Having thus described my invention, what I claim as new, and desire to secure by Letter Patent, is—

The combination of the three gates B B C, arranged within a flume or box, A, and connected together to operate in the manner substantially as and for the purpose herein set forth.

WILLIAM L. CLARK.

Witnesses:
H. J. ROBERTS,
W. H. JONES.